UNITED STATES PATENT OFFICE 2,099,348

PROCESS FOR RECLAIMING FILM SCRAPS

Marvin J. Reid, Rochester, N. Y., assignor to Eastman Kodak Company, Rochester, N. Y., a corporation of New Jersey No Drawing. Application February 10, 1937, Serial No. 125,117

8 Claims. (Cl. 260—102)

This invention relates to the reclamation of photographic film scrap having a base of an organic acid ester of cellulose.

There are three general classes of cellulose acetate film waste, these being,

1. Photographic film in which the base is cellulose acetate, overcoated with nitrocellulose and tinted.
2. Film in which the cellulose acetate base is colored and which has been coated with a sub.
3. Uncolored photographic film, the base of which is clear cellulose acetate overcoated with nitrocellulose. In previous processes for recovering film scrap of this type, the use of volatile solvents has been thought to be necessary. This has resulted in high cost in the recovery of the solvent and discomfort to the workers employed in carrying out such a process.

I have found a process for recovering cellulose acetate film scrap which is adapted to the recovering of the cellulose acetate in colorless form from all three of the types listed so that it may be used in making further film base therefrom. If only one of these types is to be processed the general procedure which I have discovered may be modified so as to be particularly adapted for the recovery of acetate from that particular scrap.

I have found that cellulose acetate can be satisfactorily reclaimed from photographic film, having a base of that ester, by first comminuting the scrap and removing the emulsion therefrom, bleaching the support and then leaching in a dilute, hot aqueous caustic solution for 1–4 hours. In the case of the third type of scrap in which there is no coloring, the bleaching step may be omitted. With the second type of scrap in which no nitrocellulose is present, the concentration of the alkali may be less than where nitrocellulose is used. Nevertheless all three types of scrap, especially if mixed together, may be treated by my general process and the cellulose acetate recovered therefrom.

My process involves treating the waste film, which has been comminuted and washed with hot water to remove the gelatin emulsion therefrom, with a dilute hypochlorite bleach liquor for a short time, such as about an hour. The liquor is then removed and the scrap is treated at an elevated temperature with an aqueous leaching liquor in which a small amount of caustic is dissolved. Some of the purposes of this leaching are to remove the products of the bleaching, denitrate the nitrocellulose layers and hydrolyze the surface of the cellulose acetate to make that surface insoluble in acetone. The depth to which the surface of the cellulose acetate is to be hydrolyzed is regulated by the proportion of caustic employed in the liquor, the temperature and the length of time of the treatment. The severity of the leaching treatment will ordinarily be governed by the condition of the surface of the cellulose acetate after it has been subjected to the bleaching treatment. For instance, if the dye or tint is especially tenacious, the bleaching treatment will usually be more severe and, therefore, the surface of the cellulose acetate will be more affected than where the tint is readily removable. After the leaching with hot aqueous caustic, the support is washed with several changes of water and dried and then dissolved in acetone into a thin dope, such as 1 part of reclaimed scrap to 10 parts of acetone. This dope is then centrifuged to remove the insoluble portions, such as the acetate which has been hydrolyzed beyond acetone solubility. The acetone solution is then ready to be made up to coating viscosity by the addition of the required amount of cellulose acetate and plasticizer.

The following examples are illustrative of processes embodying my invention:

Example I 250 parts of photographic film scrap, having a base of cellulose acetate, a nitrocellulose overcoating and a blue tinting, was chopped in pieces approximately 1 inch square and treated with water at 125° F. to remove the gelatin emulsion therefrom. It was then bleached one hour in a calcium-sodium hypochlorite bleach liquor, the hypochlorite being present in an amount that the liquor has approximately .2% available chlorine. The film was then separated from the bleaching liquor and subjected to a treatment for 2 hours with aqueous caustic soda of .5% concentration at 170° F. The film was then washed thoroughly with water to remove the caustic solution therefrom, dried and fed into a mixer with 10 parts of acetone. After the acetone soluble portion was dissolved, the mass was centrifuged to remove the insoluble portion. Plasticizer and further cellulose acetate was added to make the solution up to the specifications of a coating solution.

Example II 250 parts of scrap untinted photographic film, having a base of cellulose acetate overcoated with nitrocellulose, was chopped and washed in warm water to remove the gelatin emulsion therefrom. As no color was present, a bleaching treatment was unnecessary. The scrap was then agitated in a .5% aqueous caustic solution at 170° F., thoroughly washed in water to remove the caustic and then dissolved in acetone to form a thin dope. This dope was centrifuged to remove the insoluble materials therein and made up to coating specifications.

*Example III*

250 parts of scrap photographic film, having a base of colored cellulose acetate, was chopped to the desired size and washed in warm water to remove the gelatin emulsion therefrom. It was then bleached in a hypochlorite bleach liquor having approximately .2% available chlorine until the desired reduction of color took place and was separated from the liquor. The scrap was then treated with a .1% aqueous caustic solution at 170° F. for 2 hours. The concentration of the caustic and the length of treatment may be varied to give the desired hydrolysis of cellulose acetate which in turn depends upon the amount of bleaching which was necessary. As a mild bleach was employed in this example, a more dilute caustic solution was used. The material was then washed, dried, made into a thin acetone dope and clarified, as in the previous examples.

The amount of bleaching is constant for each individual type of photographic film scrap and, therefore, once the amount of bleaching has been determined, the necessary caustic concentration and the time of treatment can also be established. Although the proportions given may be used on any type of cellulose acetate photographic scrap, it may be necessary to use a more severe bleaching to give optimum results on particular scrap, while with some other types of scrap, the bleaching may be less severe than that used on the colored scrap in the above examples. It is desirable that the amount of bleaching be kept at a minimum for the maximum recovery of acetate from the film base. For instance, recovery of acetate from an untinted film base may be greater than that from one which has been tinted due to the fact that the bleaching treatment may be omitted and, therefore, the caustic treatment may be more mild. Instead of film scrap having a cellulose acetate base, that having a base of other organic acid esters of cellulose, such as, for example, cellulose acetate propionate and cellulose acetate butyrate may be treated by my process to recover the ester which was employed for the base of the film. If the coloring in the film is not objectionable, the bleaching step may be omitted and the dope formed will, therefore, go to make up film base which is also colored. In that case the caustic solution used to treat the scrap will, of course, be of less concentration.

In the bleaching portion of my process the concentration of the bleach liquor may be varied within wide limits it merely being necessary that sufficient chlorine be present to assure the required bleaching. If a more concentrated solution is used an excess of available chlorine might remain in the bleach solution after sufficient bleaching has been obtained. It is preferred that at least .2% available chlorine be present ordinarily although with some film scrap .1% or even less would be sufficient to give the required bleaching.

It is preferred that the bleach liquor be slightly acid, the amount of the acidifying reagent used determining the rate at which the bleaching occurs.

Although it is preferred to use calcium-sodium hypochlorite as the bleach because of the convenience in handling and its greater stability, a solution of all calcium hypochlorite or all sodium hypochlorite or of chlorine water can be employed instead. Other oxidizing bleaches such as of an alkali metal permanganate or a peroxide of hydrogen or of sodium may be employed in place of the chloride bleach, if desired.

After the bleaching treatment the scrap is removed from the bleaching liquor and then subjected to the alkali treatment. Washing of the scrap before the alkali treatment is unnecessary.

As pointed out above the strength of the caustic alkali solution may be governed by the amount of hydrolysis desired. The concentrations of alkali which will be suitable in my process will ordinarily fall within the range of .01%–1%.

In the making up of dopes or solutions of the scrap, any suitable solvent might be employed. Although acetone is referred to above other solvents such as those containing a predominant proportion of ethylene chloride or propylene chloride or a mixture of these liquids may be employed to prepare solutions of the scrap. In cases where the coloring of the film is retained the use of an alkylene chloride solvent is preferred.

As pointed out above, the method found to be most suitable for clarifying the solution or dope is centrifuging. Other methods such as filtering or screening might be used but they have not proved to be as economical as centrifuging. The term "clarifying" as used herein is to be understood as the removal of insoluble material from a liquid. As disclosed herein, some solutions might be colored and "clarifying" merely refers to the removal of insoluble materials therefrom without destroying the color of the solution.

I claim:—

1. A method of recovering an organic acid ester of cellulose from photographic film scrap containing it which comprises removing the gelatin emulsion therefrom, treating the scrap with a very dilute aqueous caustic solution at an elevated temperature, washing the caustic therefrom, drying, dissolving the material to form a thin solution in a solvent therefor and then clarifying the solution to remove the insoluble particles therefrom.

2. A method of recovering cellulose acetate from scrap photographic film having a cellulose acetate base which comprises removing the gelatin emulsion therefrom, treating in a very dilute aqueous caustic solution at an elevated temperature to hydrolyze the surface of the cellulose acetate to the desired depth, washing the caustic from the material, drying, dissolving the material in a solvent therefor to form a thin solution and then clarifying the solution to remove the insoluble particles therefrom.

3. A method of recovering cellulose acetate from scrap colored photographic film containing a cellulose acetate base which comprises removing the gelatin emulsion therefrom, bleaching the scrap until the color has been removed, treating the scrap with a very dilute aqueous caustic to hydrolyze the surface of the cellulose acetate to the desired depth, washing the material substantially free of caustic, drying, dissolving the material in acetone to form a thin solution thereof and then clarifying the thin solution to remove the insoluble particles therefrom.

4. A method of recovering an organic acid ester of cellulose from photographic film scrap containing it which comprises removing the gelatin emulsion therefrom, treating the scrap with a very dilute aqueous caustic solution at an elevated temperature, washing the caustic therefrom, drying, dissolving the material to form a thin solution in a solvent therefor and then centrifuging to remove the insoluble particles therefrom.

5. A method of recovering cellulose acetate from scrap photographic film having a cellulose acetate base which comprises removing the gelatin emulsion therefrom, treating in a very dilute aqueous caustic solution at an elevated temperature to hydrolyze the surface of the cellulose acetate to the desired depth, washing the caustic from the material, drying, dissolving the material in a solvent therefor to form a thin solution and then centrifuging the dope to remove the insoluble particles therefrom.

6. A method of recovering cellulose acetate from scrap colored photographic film containing a cellulose acetate base which comprises removing the gelatin emulsion therefrom, bleaching the scrap, with a chlorine-available bleaching liquor until the color has been removed, treating the scrap with a very dilute aqueous caustic to hydrolyze the surface of the cellulose acetate to the desired depth, washing the material substantially free of caustic, drying, dissolving the material in acetone to form a thin solution thereof and then clarifying the thin solution to remove the insoluble particles therefrom.

7. A method of recovering cellulose acetate from scrap colored photographic film containing a cellulose acetate base which comprises removing the gelatin emulsion therefrom, bleaching the scrap with a hypochlorite bleach liquor until the color has been removed, treating the scrap with a very dilute acqueous caustic to hydrolyze the surface of the cellulose acetate to the desired depth, washing the material substantially free of caustic, drying, dissolving the material in acetone to form a thin solution thereof and then clarifying the thin solution to remove the insoluble particles therefrom.

8. A method of recovering cellulose acetate from scrap photographic film having a cellulose acetate base which comprises removing the gelatin emulsion therefrom, bleaching in a hypochlorite bleach liquor for approximately one hour, then treating the material from 1-4 hours in aqueous caustic of .01%-1% concentration at 170° F., washing with water to remove the caustic, drying, dissolving the material in acetone and centrifuging to remove the insoluble portion therefrom.

MARVIN J. REID.